US009326493B2

(12) United States Patent
Han et al.

(10) Patent No.: US 9,326,493 B2
(45) Date of Patent: May 3, 2016

(54) AUTOMATIC FEEDING SYSTEM FOR UNDERWATER FISH FARM

(75) Inventors: Jungho Han, Jeju-si (KR); Seungju Lee, Jeju-si (KR)

(73) Assignee: NNT-SYSTEMS CO., LTD., Jeju-Do (KR)

( * ) Notice: Subject to any disclaimer, the term of this patent is extended or adjusted under 35 U.S.C. 154(b) by 371 days.

(21) Appl. No.: 13/979,663

(22) PCT Filed: Apr. 13, 2011

(86) PCT No.: PCT/KR2011/002640
§ 371 (c)(1),
(2), (4) Date: Jul. 15, 2013

(87) PCT Pub. No.: WO2012/099299
PCT Pub. Date: Jul. 26, 2012

(65) Prior Publication Data
US 2013/0284105 A1    Oct. 31, 2013

(30) Foreign Application Priority Data

Jan. 20, 2011    (KR) .................. 10-2011-0005742

(51) Int. Cl.
*A01K 61/02*    (2006.01)
*A01K 61/00*    (2006.01)

(52) U.S. Cl.
CPC ............. *A01K 61/02* (2013.01); *A01K 61/007* (2013.01)

(58) Field of Classification Search
CPC ... A01K 61/007; A01K 61/002; A01K 61/02; A01K 63/00; A01K 61/00; A01K 61/005
USPC .................. 119/230, 200, 215, 221
See application file for complete search history.

(56) References Cited

U.S. PATENT DOCUMENTS

| 3,998,186 | A | * | 12/1976 | Hodges | ................ A01K 61/005 119/207 |
| 4,312,296 | A | * | 1/1982 | Stelleman | .............. A01K 63/00 119/223 |
| 4,936,253 | A | * | 6/1990 | Otamendi-Busto | .. A01K 61/007 119/223 |

(Continued)

FOREIGN PATENT DOCUMENTS

| JP | 05236842 A | * | 9/1993 |
| KR | 10-0946341 B1 | | 3/2010 |
| KR | 10-0968527 B1 | | 7/2010 |

OTHER PUBLICATIONS

International Search Report of PCT/KR2011/002640 mailed on Feb. 23, 2012 from ISA/KR.

*Primary Examiner* — Yvonne Abbott-Lewis
(74) *Attorney, Agent, or Firm* — Revolution IP, PLLC

(57) ABSTRACT

Disclosed is an automatic feeding system for an underwater fish farm, which includes a marine base facility standing vertically in the sea; an underwater fish farm installed on an outer surface of the marine base facility; a storage tank installed inside the marine base facility to store feed to be supplied to the underwater fish farm; a feed transfer device transferring the feed discharged through an outlet of the storage tank; a feed supply device mixing seawater with the feed transferred by the feed transfer device and supplying the mixture to the underwater fish farm; a controller installed inside the marine base facility to control operations of the feed transfer device and the feed supply device; and an illumination device installed in the underwater fish farm to illuminate an inside of the underwater fish farm.

18 Claims, 10 Drawing Sheets

(56) References Cited

U.S. PATENT DOCUMENTS

| | | | | |
|---|---|---|---|---|
| 5,617,813 A * | 4/1997 | Loverich | | A01K 61/007 119/223 |
| 6,041,738 A | 3/2000 | Hemauer et al. | | |
| 7,743,733 B2 * | 6/2010 | Harrison | | A01K 61/02 119/210 |
| 8,506,811 B2 * | 8/2013 | Bradley | | A01K 63/04 119/227 |
| 2009/0235870 A1 * | 9/2009 | Troy | | A01K 61/007 119/223 |
| 2010/0150664 A1 * | 6/2010 | Jakubowski | | A01K 61/007 405/224 |
| 2012/0006277 A1 * | 1/2012 | Troy | | A01K 61/007 119/223 |
| 2012/0058542 A1 * | 3/2012 | Wu | | A01K 61/00 435/257.1 |

* cited by examiner

AUTOMATIC FEEDING SYSTEM FOR UNDERWATER FISH FARM

CROSS REFERENCE TO PRIOR APPLICATIONS

This application is a National Stage Application of PCT International Patent Application No. PCT/KR2011/002640 filed on Apr. 13, 2011, under 35 U.S.C. §371, which claims priority to Korean Patent Application No. 10-2011-0005742 filed on Jan. 20, 2011, which are all hereby incorporated by reference in their entirety.

TECHNICAL FIELD

The present invention relates to an automatic feeding system for an underwater fish farm, and more particularly, to an automatic feeding system for an underwater fish farm which enables automatic feeding in an underwater fish farm irrespective of weather conditions.

BACKGROUND ART

Generally, cultivation using seawater may be largely classified into a land-based aquarium farming and an underwater fish farming. The land-based aquarium farming is to move target organisms to a water tank on the ground and cultivate the organisms while artificially adjusting inhabited environment, and the underwater fish farming is to cultivate target organisms while enclosing the organisms with nets or the like in wide areas in the sea. The use of the underwater fish farming tends to increase because the underwater fish farming need not replace seawater, as opposed to the land-based aquarium farming, and can cultivate fish in large quantities. In the underwater fish farming, persons directly scatter feed in the sea in a spraying or throwing manner.

However, in the underwater fish farming, the manual feed supply is almost impossible when weather conditions are bad. When the underwater fish farming is performed in the ocean far away from the ground, persons have to move a long distance everyday.

In addition, since feed is manually supplied, large-size fish farms require a lot of workers. Thus, a lot of money is spent in cultivation of fish. Moreover, since feed must be supplied everyday, a person cannot leave the fish farm for a long time.

The feed supplied by a person floats in the sea for a predetermined time, absorbs water, and then deposits on the seabed. Thus, a large amount of feed is washed away while fishes do not eat the feed. As a result, feed is unnecessarily wasted and seawater is polluted by the wasted feed.

SUMMARY OF INVENTION

The present invention has been made in an effort to solve the above problems, and provides an automatic feeding system for an underwater fish farm, including: a marine base facility standing vertically in the sea, in which a lower portion is fixed on the seabed and an upper portion is exposed above the sea surface; an underwater fish farm installed on an outer surface of the marine base facility; a storage tank installed inside the marine base facility to store feed to be supplied to the underwater fish farm; a feed transfer device transferring the feed discharged through an outlet of the storage tank; a feed supply device mixing seawater with the feed transferred by the feed transfer device and supplying the mixture to the underwater fish farm; a controller installed inside the marine base facility to control operations of the feed transfer device and the feed supply device; and an illumination device installed in the underwater fish farm to illuminate an inside of the underwater fish farm to prevent cultivated fishes from dying due to collision with a fishing net.

In addition, the present invention provides an automatic feeding system for an underwater fish farm, including: a marine base facility standing vertically in the sea, in which a lower portion is fixed on the seabed and an upper portion is exposed above the sea surface; an underwater fish farm installed under water spaced apart from the marine base facility by tens to thousands of meters; a storage tank installed inside the marine base facility to store feed to be supplied to the underwater fish farm; a feed transfer device transferring the feed discharged through an outlet of the storage tank; a feed supply device mixing seawater with the feed transferred by the feed transfer device and supplying the mixture to the underwater fish farm; a controller installed inside the marine base facility to control operations of the feed transfer device and the feed supply device; and an illumination device installed in the underwater fish farm to illuminate an inside of the underwater fish farm to prevent cultivated fishes from dying due to collision with a fishing net.

Advantageous Effects of Invention

According to the present invention, since the automatic feeding system is installed inside the marine base facility, feed can be stably supplied to the underwater fish farm irrespective of weather conditions.

Also, according to the present invention, since power is supplied to the automatic feeding apparatus by using the independent power generation facility, such as the solar panel or the wind power generator, feed can be stably supplied to the underwater fish farm, without separate fuel supply.

In addition, according to the present invention, the use of the controller and the remote communication facility makes it possible to automatically supply an appropriate amount of feed to cultivated fishes at a desired time even in the event of typhoon or high waves. Since an exact amount of feed to be supplied to fishes is determined using the underwater camera, it is possible to prevent the waste of feed and the marine pollution caused excessive supply of feed.

Furthermore, according to the present invention, the marine base facility and the underwater fish farm can be utilized as tourism resources by installing the convenient facility and the observation window in the marine base facility such that tourists can view the underwater fish farm.

Moreover, according to the present invention, cultivation efficiency can be improved by installing separate illumination devices in the underwater fish farm so as to prevent cultivated fishes from dying due to collision with the fishing net.

DESCRIPTION OF EMBODIMENTS

Figure 1:
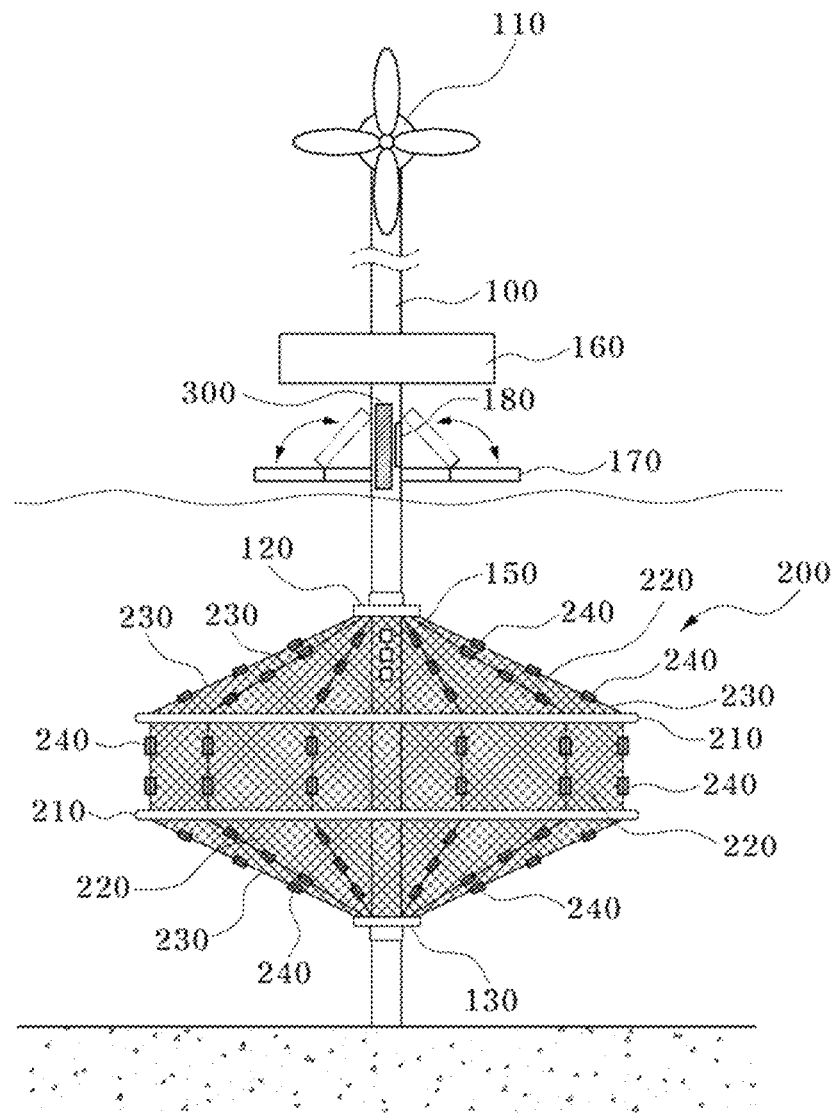
FIG. 1 is a diagram illustrating an automatic feeding system for an underwater fish farm according to a first embodiment of the present invention.

Hereinafter, preferred embodiments of the present invention, in which the above objects can be concretely realized, will be described with the accompanying drawings. In the description of the present embodiments, the same names and the same reference numerals are used to refer to the same elements, and additional description thereof will be omitted herein.

FIG. 1 is a diagram illustrating an automatic feeding system for an underwater fish farm according to a first embodiment of the present invention.

As illustrated in FIG. 1, the automatic feeding system for the underwater fish farm according to the first embodiment of the present invention largely includes a marine base facility 100, an underwater fish farm 200, and an automatic feeding apparatus 300.

The marine base facility 100 (pile or pole) is a structure that is permanently fixedly installed in the sea. The marine base facility 100 stands vertically in the sea, in which a lower portion is fixed on the seabed and an upper portion is exposed above the sea surface. The marine base facility 100 is manufactured in a form of a cylindrical pile, a triangular pillar pile, or a jacket type structure, the diameter of which exceeds 4 m. In order for the marine base facility 100 to remain unaffected and sufficiently withstand waves, the seabed is drilled using an Auger drill, or the seabed is deeply excavated by pile driving or the like, and then, the marine base facility 100 is installed in the drilled or excavated seabed.

Herein, the marine base facility 100 may be a marine wind power plant in which a wind power generator 110 is installed on the top thereof. Since the marine wind power plant is a structure that has already been installed in the sea, separate operations for installing the above-described marine base facility 100 are not required when the marine wind power plant is used as the marine base facility 100, and an installation space for the automatic feeding apparatus 300 to be described below can easily be secured. As such, installation cost and time for the marine base facility 100 and the automatic feeding apparatus 300 can be remarkably reduced. In addition, even when no fuel is separately supplied, the automatic feeding apparatus 300 and the like can be operated using power produced by the wind power generator 110, leading to a reduction in fuel cost.

As an alternative to the wind power generator 110, an independent power generation facility, such as a solar panel, may be installed on the top of the marine base facility 100 to produce power necessary for the operation of the automatic feeding apparatus 300.

The underwater fish farm 200 is a place where various types of fish are cultivated, and is installed on the outer surface of the marine base facility 100. The underwater fish farm 200 includes a pair of rims 210 forming a frame, a net 220 covering the rims 210, and a rope 230 maintaining the net 220 in a tightly stretched state. First and second fixing devices 120 and 130 for fixing the net 220 and the rope 230 are installed in the marine base facility 100.

Therefore, the pair of rims 210 is installed under water to surround the marine base facility 100, and the upper and lower portions of the net 220 covering the rims 210 and the upper and lower portions of the rope 230 are connected to the first and second fixing devices 120 and 130, respectively. In this manner, the operation of installing the underwater fish farm 200 in the marine base facility 100 is completed. Each of the rims 210 may be made of various materials, such as a metal (steel) or a synthetic resin (PVC, PE, PPC, etc.). Each of the rims 210 has a hollow structure for the purpose of air injection for buoyancy control. That is, the inside of each of the rims 210 is empty.

Figure 2:
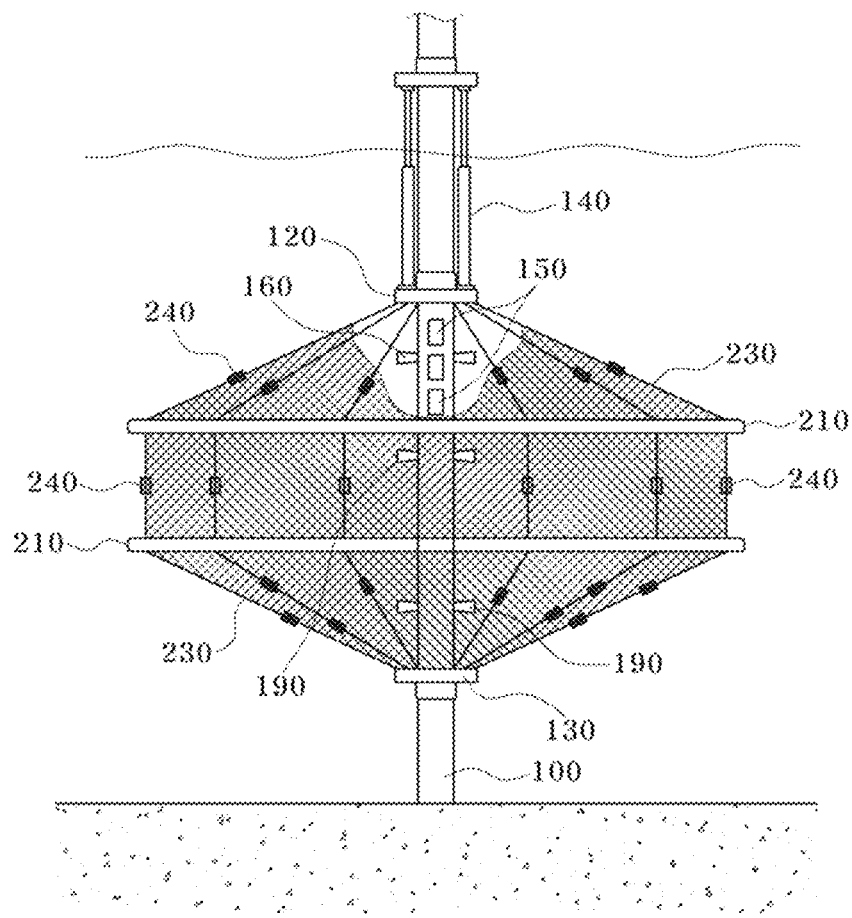
FIG. 2 is a detailed diagram illustrating a construction of a marine base facility and an underwater fish farm illustrated in FIG. 1.

FIG. 2 is a detailed diagram illustrating the construction of the marine base facility and the underwater fish farm illustrated in FIG. 1.

When a repair of the underwater fish farm 200 or a harvest of cultivated fishes is required, the underwater fish farm 200 needs to float to the surface of the water. Therefore, as illustrated in FIG. 2, a hydraulic or pneumatic cylinder 140 capable of moving the entire underwater fish farm 200 in a vertical direction is installed in the marine base facility 100.

A plurality of observation windows 150 are installed in the marine base facility 100, so that fishes cultivated in the underwater fish farm 200 can be utilized as tourism resources. The observation window 150 is installed in the marine base facility 100 at each water level, so that persons can observe fishes cultivated in the underwater fish farm 200 with the naked eyes. When the quantity of light is deficient according to depth of water or weather conditions, fishes inside the underwater fish farm 200 may not be observed through the observation window 150 with the naked eyes. Therefore, it is preferable that a separate illumination device (not illustrated) for illuminating the underwater fish farm 200 be installed in the marine base facility 100.

On the other hand, as illustrated in FIG. 1, a convenience facility 160 tourists can use as a waiting room and a lounge, a docking apparatus 170 which is foldable for anchoring a ship, and a doorway 180 through which persons enter and exit, are provided in the upper portion of the marine base facility 100.

The convenience facility 160, the observation window 150, and the doorway 180 are connected through spiral stairs or a hydraulic elevator. Therefore, persons can enter the marine base facility 100 through the doorway 180, take a rest in the convenience facility 160, and move to the observation window 150 to observe fishes cultivated in the underwater fish farm 200.

Figure 3:
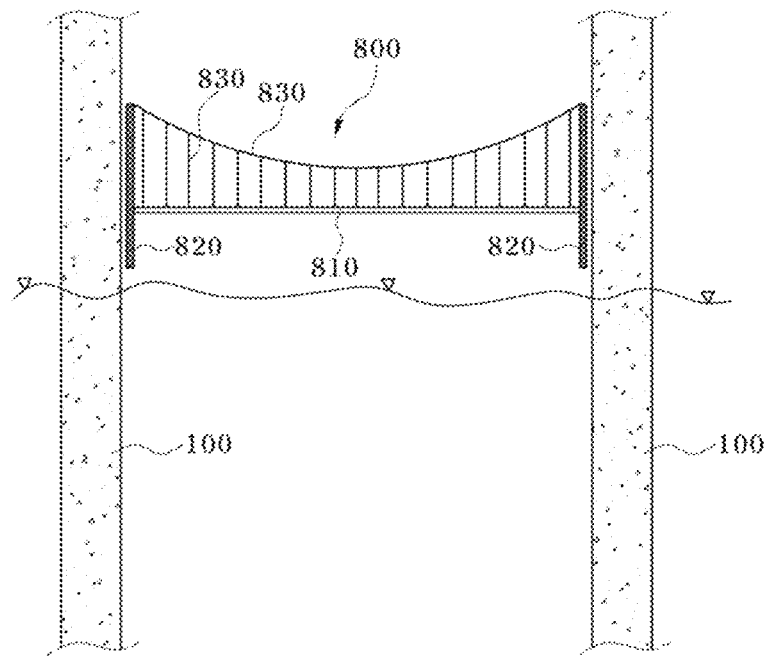
FIG. 3 is a diagram illustrating a bridge structure that is installed between marine base facilities according to the present invention.

FIG. 3 is a diagram illustrating a bridge structure that is installed between marine base facilities according to the present invention.

In addition, as illustrated in FIG. 3, a plurality of marine base facilities 100 may be installed in the sea, and bridges 800 may be installed to allow persons to walk between the marine base facilities 100. If the bridge 800 is installed between the marine base facilities 100, tourists can walk between the marine base facilities 100 over the bridge 800, or enjoy sea fishing on the bridge 800. Even a few managers can maintain the plurality of marine base facilities 100 at the same time because they can freely come and go between the marine base facilities 100.

The bridge 800 includes a top plate 810 installed to allow persons to walk between the marine base facilities 100, a support 820 installed on both ends of the top plate 810, and a wire rope 830 connecting the support 820 and the top plate 810. The bridge 800 may be manufactured in various structures and shapes. For example, the bridge 800 may be manufactured in a concrete structure.

Figure 4:
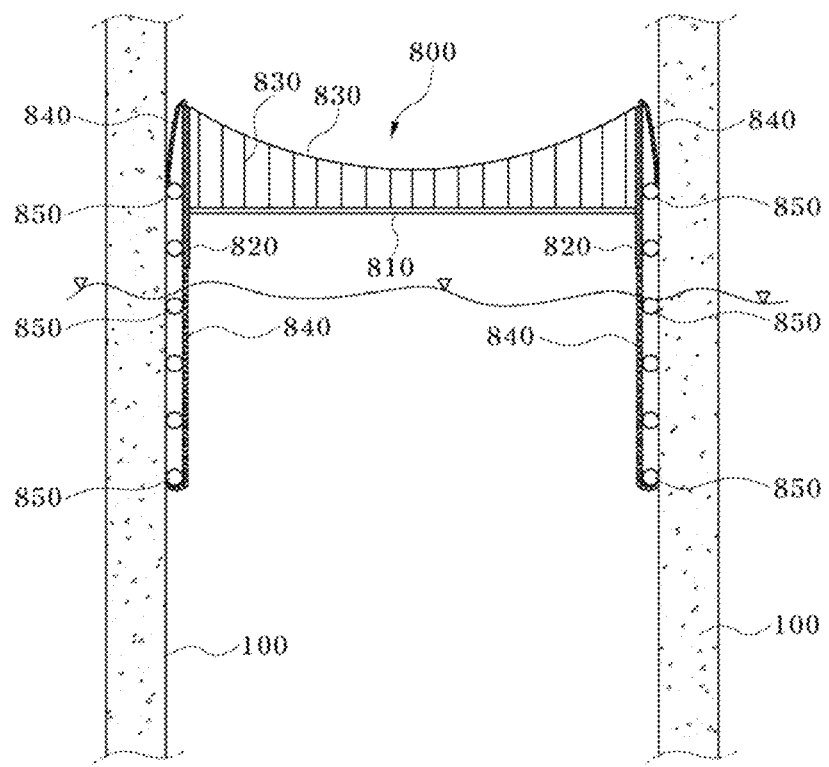
FIGS. 4 to 6 are diagrams illustrating a bridge structure that is vertically movably installed in the marine base facility according to the present invention.
Figure 5:
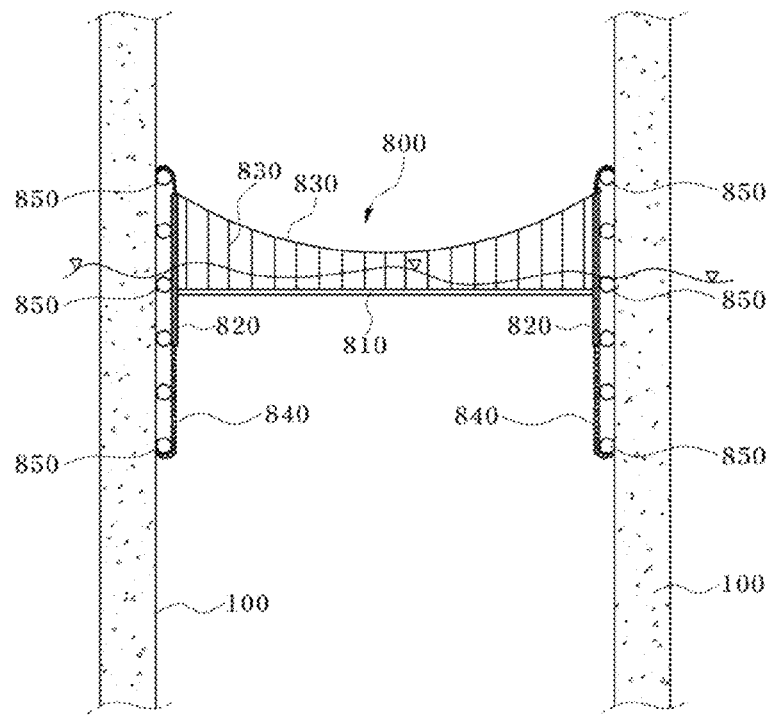
Figure 6:
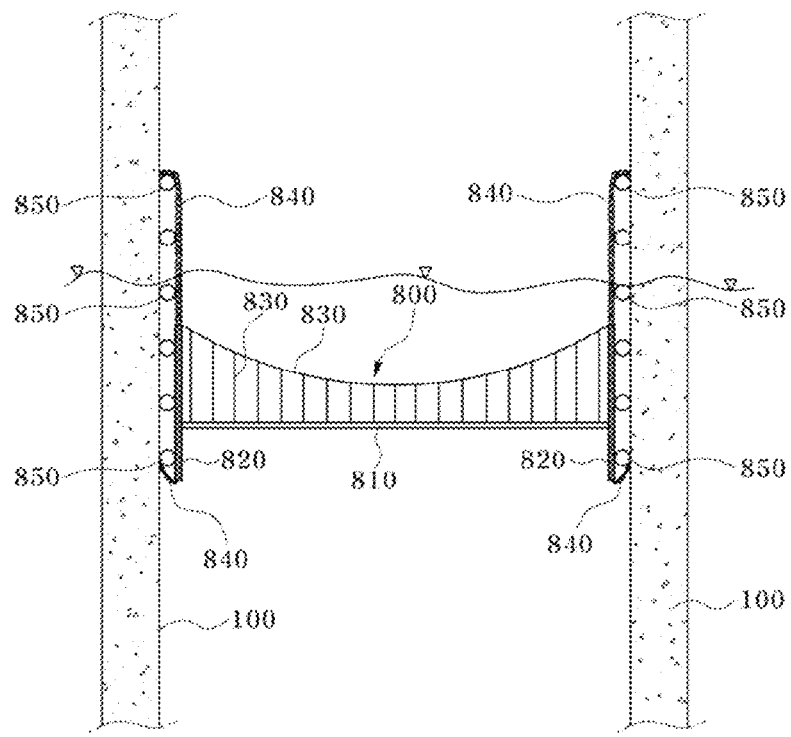

FIGS. 4 to 6 are diagrams of a bridge structure that is vertically movably installed in the marine base facility according to the present invention.

As illustrated in FIGS. 4 to 6, it is preferable that the bridge 800 be vertically movably installed in the marine base facility 100. For this purpose, a chain 840, whose length is adjusted while being wound or unwound, is connected to the lower and upper portions of the support 820. A plurality of guide rollers 850 coming into contact with the side surface of the support 820 are installed on the outer surface of each of the marine base facilities 100. Therefore, while the chain 840 is wound or unwound by a motor or the like installed in the marine base facility 100, the support 820 vertically moves along the marine base facility 100. At this time, the guide rollers 850 come into contact with the side surface of the support 820 and assists smooth vertical movement of the support 820.

Although not illustrated, structures for the vertical movement of the bridge 800 may be implemented with various embodiments. For example, guide rails may be installed in the marine base facility 100, and guide rollers to be inserted into the guide rails may be installed in the side surface of the support 820.

As described above, when the bridge 800 is vertically movably installed in the marine base facility 100, as illustrated in FIG. 5, only a part of the bridge 800 may be submerged under water, and thus, a person who crosses the bridge may experience as if he or she walks under water.

In addition, the height of the bridge 800 can be adjusted according to a variation in the height of the sea surface at low tide and high tide. When a typhoon comes or weather conditions are poor, the bridge 800 is placed under the sea surface as illustrated in FIG. 6, preventing the bridge from being damaged by high waves or winds.

As such, if various facilities, such as the convenience facility 160, the docking apparatus 170 for anchoring a ship, the underwater fish farm 200, the observation window 150 allowing persons to observe the underwater fish farm 200, and the above-described bridge 800, are installed in the marine base facility 100, the marine base facility 100 can be utilized as tourism resources, contributing greatly to an increase of income in a corresponding region.

The automatic feeding apparatus 300 is installed inside the marine base facility 100 to supply stored feed to the underwater fish farm 200 disposed under water. When the automatic feeding apparatus 300 is installed inside the marine base facility 100, feed can be stably supplied to the underwater fish farm 200 irrespective of weather conditions. Therefore, an operation of supplying feed to the underwater fish farm 200 becomes more convenient, and fishes can be stably cultivated, improving productivity of cultivated fishes.

The construction of the automatic feeding apparatus 300 will be described below in more detail.

Figure 7:
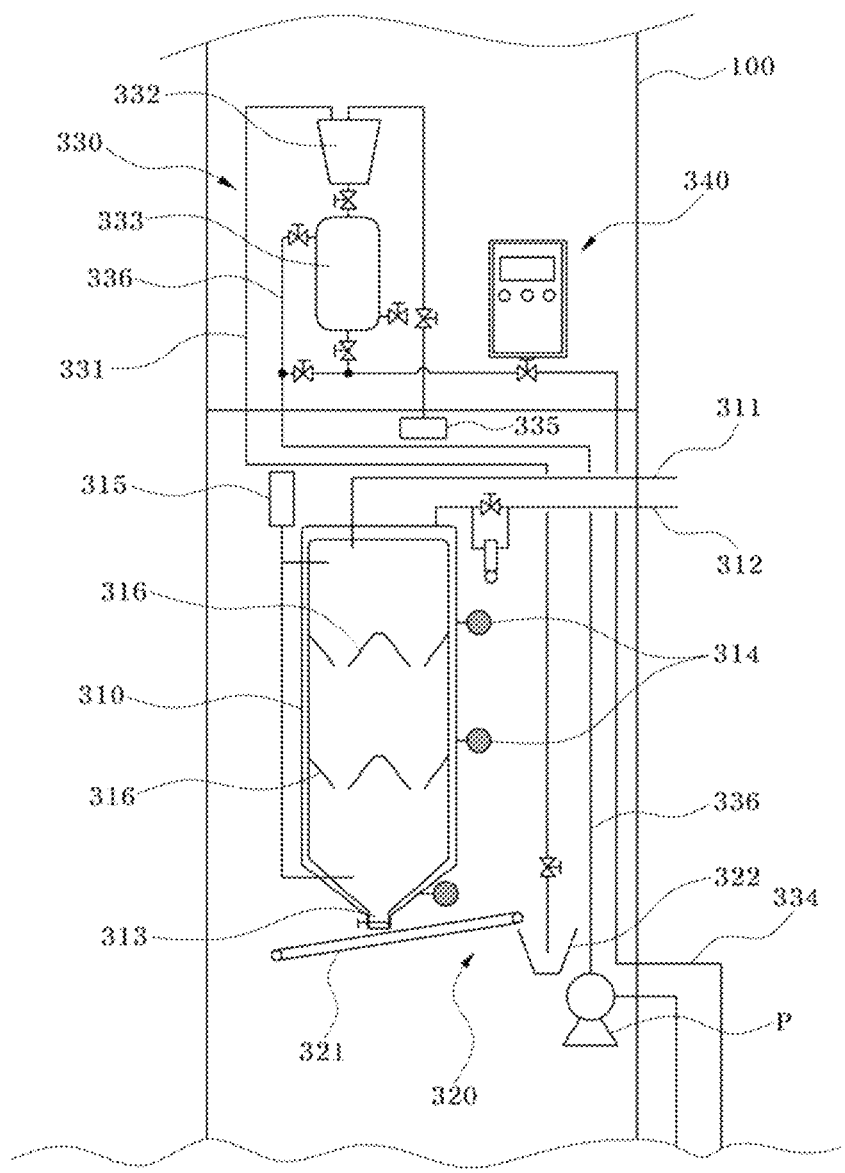
FIG. 7 is a diagram illustrating a construction of an automatic feeding apparatus according to the present invention.

FIG. 7 is a diagram illustrating the construction of the automatic feeding apparatus according to the present invention.

As illustrated in FIG. 7, the automatic feeding apparatus 300 according to the present invention includes a storage tank 310, a feed transfer device 320, a feed supply device 330, and a controller 340.

The storage tank 310 is installed inside the marine base facility 100 to store feed to be supplied to the above-described underwater fish farm 200. It is preferable that the storage tank 310 be made large enough to store an amount of feed which can be supplied to the underwater fish farm 200 for at least one month, and the storage tank 310 be installed inside the marine base facility exposed above the sea surface so that a feed carrier can approach the storage tank 310 and easily supply feed thereto.

The storage tank 310 has a dual-wall structure so that feed cannot be deteriorated even when stored in the sea for a predetermined period of time. When a temperature difference between the inside and outside of the storage tank 310 is large, condensation occurs in the inside of the storage tank 310, causing deterioration of feed. Therefore, the occurrence of condensation in the inside of the storage tank 310 is prevented by making the storage tank 310 in a dual-wall structure and inserting an urethane foam or insulating material between the dual walls or evacuating a space between the dual walls.

The structure of the storage tank 310 will be described below in more detail. A feed supply pipe 311 and a vent pipe 312 are installed in an upper portion of the storage tank 310, and an outlet 313 is formed in a lower portion of the storage tank 310. The feed supply pipe 311 is configured to supply feed transported through the ship to the inside of the storage tank 310. The vent pipe 312 is a type of a ventilation opening for temperature balance and moisture removal in the inside of the storage tank 310. The feed is discharged through the outlet 313.

The vent pipe 312 also has a function of externally discharging air flowing into the storage tank 310 through the feed supply pipe 311 together with the feed. Specifically, when the feed is supplied to the storage tank 310 by a compressed air facility (not illustrated) installed in a barge or the like, a vacuum suction device (not illustrated) provided inside the marine base facility 100, or the like, air flowing into the storage tank 310 through the feed supply pipe 311 together with the feed is externally discharged through the vent pipe 312.

In addition, a sensor 314 is installed in the storage tank 310 so as to measure an amount of feed in real time or always measure a condensation state. Since a signal output from the sensor 314 is transmitted to the controller 340 to be described below, the amount of feed stored in the storage tank 310 and the internal state of the storage tank 310 are monitored in real time.

In addition, an agitator 315 is installed in the storage tank 310. The agitator 315 may be a screw or a vacuum pump that is rotated by a motor. The agitator 315 agitates the feed inside the storage tank 310, preventing the feed from agglomerating each other and clogging the outlet 313 of the storage tank 310 or preventing the feed from being deteriorated. The agitating time and the number of times of agitation by the agitator 315 are automatically controlled by the controller 340.

In addition, a hopper 316 is provided inside the storage tank 310 so as to discharge the feed. The hopper 316 may be provided in parallel inside the storage tank 310, or two or more hoppers 316 may be vertically installed inside the storage tank 310 to disperse the weight of the feed. Therefore, like the agitator 315 described above, the hopper 316 serves to prevent the feed from being pressed by its weight to clog the outlet 313 of the storage tank 310, or prevent the feed from being deteriorated.

The feed transfer device 320 forcibly transfers the feed discharged through the outlet 313 of the storage tank 310 to the feed supply device 330. The feed transfer device 320 includes a conveyor 321 and a feed storage hopper 322. The conveyor 321 is installed under the storage tank 310 to transfer the feed discharged through the outlet 313 of the storage tank 310. The feed storage hopper 322 temporarily stores the feed transferred by the conveyor 321.

The feed supply device 330 mixes seawater with the feed transferred by the feed transfer device 320, that is, the feed transferred to the feed storage hopper 322 by the conveyor 321, and then, supplies the mixture to the underwater fish farm 200. The feed supply device 330 includes a vacuum tank 332, a mixing tank 333, and a feeding hose 334. The vacuum tank 332 is provided to suction the feed filled in the feed storage hopper 322 through a suction pipe 331. The mixing tank 333 is provided to mix the feed supplied from the vacuum tank 332 with seawater supplied by a seawater pump P. The feeding hose 334 is provided to directly supply the feed mixed with the seawater in the mixing tank 333 to the underwater fish farm 200.

The inside of the vacuum tank 332 is evacuated by a vacuum pump 335 connected to one side of the vacuum tank 332. When the inside of the vacuum tank 332 is evacuated, the feed stored in the feed storage hopper 322 is introduced into the inside of the vacuum tank 332 through the suction pipe 331 by a pressure difference.

The mixing tank 333 is connected to the vacuum tank 332 and a seawater inlet pipe 336. When the feed of the vacuum tank 332 is introduced into the mixing tank 333, the mixing tank 333 is supplied with seawater through the seawater inlet pipe 336, in which the seawater pump P is installed, and mixes the feed with the seawater.

One end of the feeding hose 334 is connected to the mixing tank 333, and the other end of the feeding hose 334 extends to the underwater fish farm 200 disposed under the sea surface, such that the feed mixed with the seawater is directly supplied to the underwater fish farm 200.

The controller 340 is installed inside the marine base facility 100 to automatically control the operation of the automatic feeding apparatus 300. The controller 340 automatically controls the feed transfer device 320 and the feed supply device 330 according to feed supply time and amount stored in a memory (not illustrated) provided inside the controller 340, and supplies a constant amount of feed to the underwater fish farm 200 at a certain time. Specifically, the controller 340 controls the driving of the conveyor 321, the vacuum pump 335, the seawater pump P, and the like, and also automatically controls opening and closing of valves installed in the storage tank 310, the vacuum tank 332, the mixing tank 333, and various pipes.

It is preferable that the controller 340 be configured to be remotely controllable on the ground. For this purpose, the marine base facility 100 may be provided with a remote communication facility (not illustrated), such as a wireless antenna, which receives a control signal transmitted from the ground and transmits a variety of data to the ground. In the case where the remote control of the controller 340 is possible, if it is necessary to change the feed supply time or amount, a person need not directly move to the marine base facility 100 so as to input necessary information to the controller 340. That is, a person can easily input or change necessary information to the controller 340 through the remote control of the controller 340 by transmitting a control signal to the controller 340. In addition, a person on the ground can directly receive a signal from the sensor 314 and check information about the amount of feed stored in the storage tank 310 and information about the internal state of the storage tank 310 in real time.

On the other hand, as illustrated in FIG. 2, an underwater camera 190 may be installed on the outer surface of the marine base facility 100. The underwater camera 190 photographs the underwater fish farm 200 in real time and transmits photographed images to the controller 340, and the controller 340 determines an amount of feed to be supplied to the underwater fish farm 200, based on the received images. Specifically, the controller 340 determines the amount of feed to be supplied to the underwater fish farm 200 by analyzing the images photographed by the underwater camera 190 and checking the sizes and individual number of fishes existing in the underwater fish farm 200.

If images photographed by the underwater camera 190 are transmitted to the ground by using a remote communication facility such as a wireless antenna and are precisely analyzed on the ground by using a computer program, the amount of feed to be supplied to the underwater fish farm 200 can be more accurately measured.

When the amount of feed to be supplied to the underwater fish farm 200 is determined using the images photographed in real time by the underwater camera 190, an exact amount of feed required can be supplied to the underwater fish farm 200. Therefore, it is possible to prevent marine pollution caused by excessive supply of feed. It is preferable that the underwater camera 190 be made of a material that can withstand marine conditions for the purpose of prevention of corrosion.

In addition, the images photographed by the underwater camera 190 can be utilized as tourism resources by allowing tourists to view the photographed images at the convenience facility 160 in real time.

On the other hand, as illustrated in FIGS. 1 and 2, a plurality of illumination devices 240 may be installed in the underwater fish farm 200. The illumination devices 240 are installed in the rope 230 or the net 220 of the underwater fish farm 200 to illuminate the inside of the underwater fish farm 200, preventing cultivated fishes from dying due to collision with the fishing net.

More specifically, since fish species such as tuna frequently dies due to collision with the underwater fish farm 200, it is preferable that the underwater fish farm 200 be brightly illuminated using the illumination devices 240. General light bulbs or the like may be used as the illumination devices 240, but LED lamps are preferable in view of power consumption.

When the light of the illumination device 240 is too strong, fishes may be stressed. Thus, it is preferable that the brightness of the illumination device 240 can be automatically adjusted by the remote control or the controller 340. Specifically, the brightness of the illumination device 240 is determined in consideration of fish type, depth of water, weather, turbidity of seawater.

In addition to the function of preventing fishes from dying due to collision with the underwater fish farm 200, the illumination device 240 may be used as an illumination device for the underwater camera 190. In addition, the illumination device 240 can allow tourists to clearly see the underwater fish farm 200 through the observation window 150. Furthermore, if necessary, the installation position of the illumination device 240 may be changed. For example, the illumination device 240 may be installed in the net 220 or the rim 210.

Figure 8:
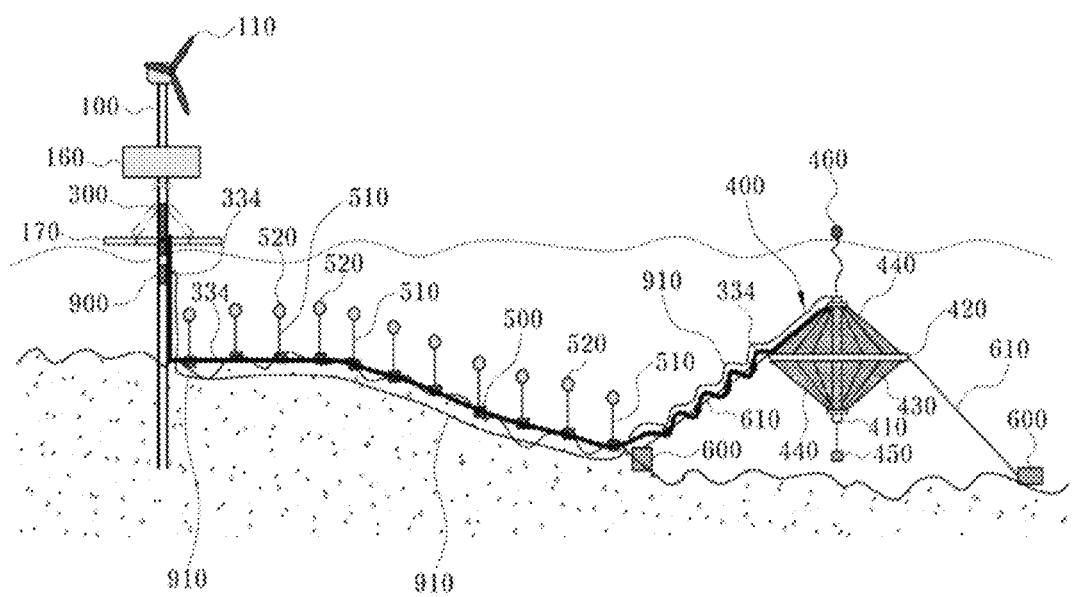
FIG. 8 is a diagram illustrating an automatic feeding system for an underwater fish farm according to a second embodiment of the present invention.

FIG. 8 is a diagram illustrating an automatic feeding system for a underwater fish farm according to a second embodiment of the present invention.

As illustrated in FIG. 8, the automatic feeding system for the underwater fish farm according to the second embodiment of the present invention includes a marine base facility 100, an underwater fish farm 400, and an automatic feeding apparatus 300. The underwater fish farm 400 is installed under water and is spaced apart from the marine base facility 100 by a predetermined distance. The automatic feeding apparatus 300 is installed inside the marine base facility 100 to supply feed to the underwater fish farm 400.

As described above, the marine base facility 100 is a structure that is permanently fixedly installed in the sea. The marine base facility 100 stands vertically in the sea. A lower portion of the marine base facility 100 is fixed on the seabed, and an upper portion of the marine base facility 100 is exposed above the sea surface. The marine base facility 100 may be a marine wind power plant in which a wind power generator 110 is installed on the top thereof. A convenience facility 160, a docking apparatus 170 which is foldable for anchoring a ship, and the like are installed in the portion exposed above the sea surface. As described above, an observation window 150 and various devices such as a remote wireless facility may be installed in the marine base facility 100. In addition, when a plurality of marine base facilities 100 are installed, bridges 800 may be installed to allow persons to walk between the marine base facilities 100 (see FIG. 3).

Unlike the first embodiment, the underwater fish farm 400 according to the second embodiment of the present invention is not installed in the marine base facility 100, but is installed under sea spaced apart from the marine base facility 100 by a predetermined distance. If the underwater fish farm 200 is installed in the marine base facility 100 like the first embodiment, various advantages can be obtained. For example, the operation of installing the underwater fish farm 200 is facilitated, and the underwater fish farm 200 can be utilized as tourism resources. However, it is necessary to increase the size of the marine base facility 100 so as to withstand the load applied by the underwater fish farm 200. As such, the construction and installation operation of the marine base facility 100 require too much expense. Therefore, the underwater fish farm 400 according to the second embodiment of the present invention is separately installed at a position spaced apart from the marine base facility 100 by a predetermined distance, so as not to affect the marine base facility 100.

Specifically, the underwater fish farm 400 includes a spar 410 serving as a center pillar, a rim 420 surrounding the spar 410, a net 430 covering the rim 420, and a rope 440 maintaining the net 430 in a tightly stretched state. The underwater fish farm 400 is installed under water spaced apart from the marine base facility 100 by tens to thousands of meters.

The spar 410 is made in a hollow cylindrical pipe shape. On behalf of the marine base facility 100, the spar 410 is used as the pillar of the underwater fish farm 400. In addition, when the inside of the spar 410 is filled with air, the spar 410 functions to lift the underwater fish farm 400 above the sea surface.

The operation of injecting air into the spar 410 is performed using an air compressor that is usually installed in a ship. Specifically, the ship is moved near to the underwater fish farm 400, and a diver or operator connects the air compressor installed in the ship to the spar 410. Then, air is injected into the spar 410. However, the operation of connecting the air compressor installed in the ship to the spar 410 is time-consuming and dangerous because a worker has to directly get into the water. If weather condition is bad, it is difficult to perform the connecting operation.

Therefore, as illustrated in FIG. 8, a separate air compressor 900 may be installed inside the marine base facility 100, and the air compressor 900 may be connected to the spar 410 through an air hose 910. In this case, when the air compressor 900 is driven in the marine base facility 100, compressed air is naturally supplied to the inside of the spar 410 through the air hose 910. Therefore, air can be supplied to the inside of the spar 410 at any time, irrespective of weather conditions. As a result, the operation of lifting the underwater fish farm 400 can be facilitated and be quickly performed. Although not illustrated, an air storage tank for storing compressed air generated by the air compressor 900 may be installed inside the marine base facility 100.

Since the air hose 910 extends along the seabed and is connected to the spar 410 of the underwater fish farm 400, there is a risk that the air hose 910 will be deviated from the original position when tidal current is severe. Therefore, a plurality of anchors 500 may be installed along the seabed at regular intervals, and the air hose 910 may be connected to the anchors 500 so that the air hose 910 maintains the state of being fixed to the seabed.

In addition, although not illustrated, if a net cleaning robot is installed in the air hose 910, the net 430 of the underwater fish farm 400 can be cleaned using compressed air supplied from the air hose 910. The net cleaning robot is an apparatus that removes foreign substances attached to the net 430 by injecting compressed air supplied from the air hose 910 to the net 430. A diver directly goes underwater and installs the net cleaning robot in the air hose 910. In this case, since the air hose 910 is in a state of being connected to the spar 410, a diver separates the air hose 910 from the spar 410 and then installs the net cleaning robot.

When the net cleaning robot is installed in the air hose 910 as described above, a diver attaches the net cleaning robot to a particular portion of the net 430 required to be cleaned, so that various foreign substances attached to the net 430 can be removed by compressed air injected from the net cleaning robot.

A ballast 450 is connected to a lower end of the spar 410 so that the underwater fish farm 400 maintains balance without being inclined by tidal current. A buoy 460 indicating the position of the underwater fish farm 400 is connected to an upper portion of the spar 410.

The underwater fish farm 400 configured as above is firmly fixed to the seabed by a block anchor 600, so that the position of the underwater fish farm 400 is not moved by tidal current. Specifically, the underwater fish farm 400 is fixedly installed on the seabed in such a manner that the underwater fish farm 400 is connected to the block anchor 6000 through a rope- or chain-type mooring line 610.

Figure 9:
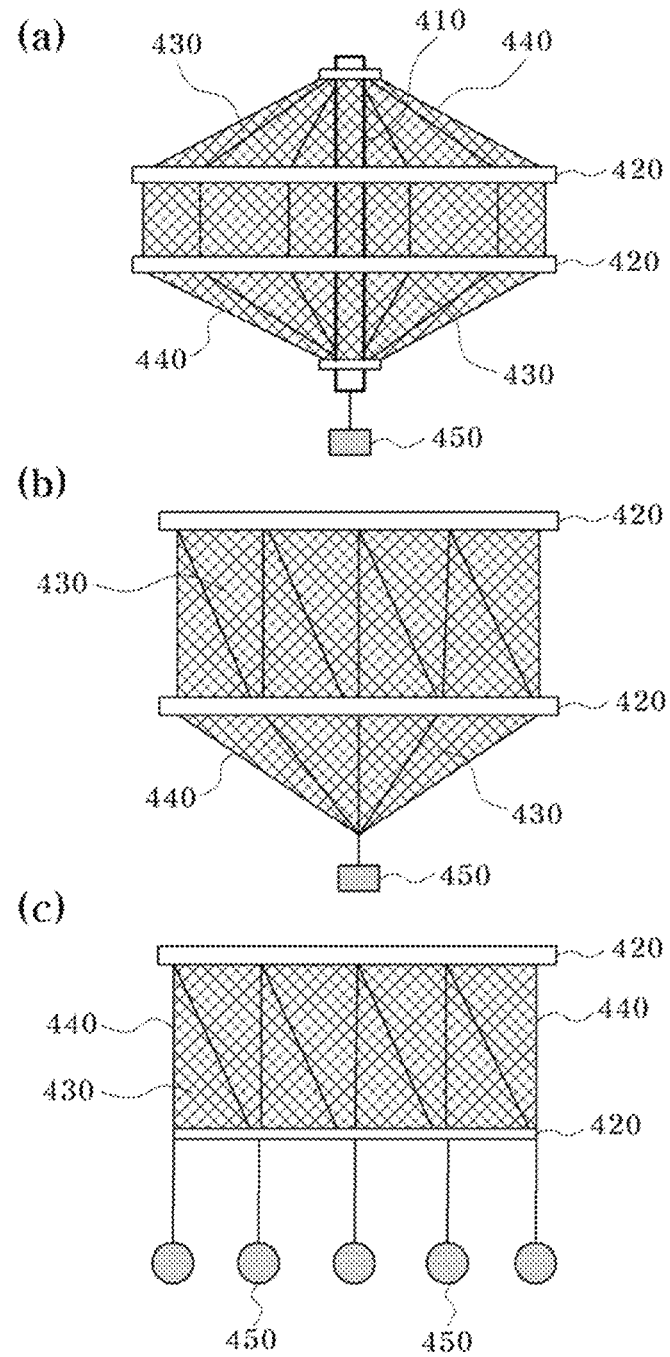
FIG. 9 is a diagram illustrating various constructions of the underwater fish farm according to the second embodiment of the present invention.

FIG. 9 is a diagram illustrating various structures of the underwater fish farm according to the second embodiment of the present invention.

As illustrated in FIG. 9, the underwater fish farm 400 may be manufactured in various shapes or sizes according to user intention or installation place. In particular, as illustrated in FIGS. 9B and 9C, the underwater fish farm 400 may be manufactured in a rectangular shape having no spar 410 serving as the center pillar.

The automatic feeding apparatus 300 is installed inside the marine base facility 100 to supply feed stored therein to the underwater fish farm 400 disposed under water. The automatic feeding apparatus has the same structure as the first embodiment, but differs from the first embodiment in that the underwater fish farm 400 is installed at a position spaced apart from the marine base facility 100, and thus, the feeding hose 334 of the automatic feeding apparatus 300 extends to the underwater fish farm 400 along the seabed. Specifically, the feeding hose 334 extending from the marine base facility 100 to the underwater fish farm 400 along the seabed is fixed to the underwater fish farm 400 by winding around the mooring line 610 for connecting the underwater fish farm 400 to the block anchor 600. Then, the feeding hose 334 supplies feed to the underwater fish farm 400.

As described above, since the underwater fish farm 400 is installed at a position spaced apart from the marine base facility 100 by tens to thousands of meters, the feeding hose 334 also extends tens to thousands of meters. Therefore, if tidal current is severe, there is a risk that the feeding hose 334 will be swept away by the tidal current and deviated from the original position, as in the air hose 910 described above. Therefore, a plurality of anchors 500 may be installed along the seabed at regular intervals, and the feeding hose 334 may be connected to the anchors 500 so that the feeding hose 334 maintains the state of being fixed to the seabed. In this case, a plurality of hydraulic plotters 520 are connected to the anchors 500. The hydraulic plotters 520 are connected to the anchors 500 by the rope 510, respectively, and function to indicate the fixed position of the feeding hose 334.

On the other hand, if the feeding hose 334 is installed along the seabed, whose inclination is severe, the operation of connecting the feeding hose 334 to the anchors 500 is difficult, and a portion of the feeding hose 334 does not maintain a straight-line shape and is fixed to the seabed in a bent shape. Therefore, there is a risk that the feeding hose 334 will be clogged and the thus the feed will not be normally supplied to the underwater fish farm 400.

Figure 10:
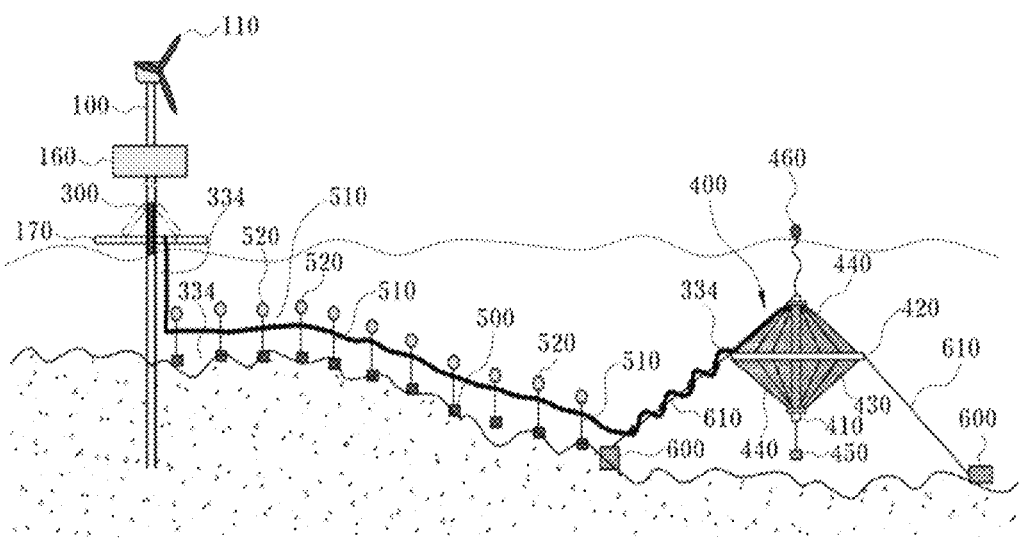
FIG. 10 is a diagram illustrating a state in which a feeding hose according to the present invention is connected to a rope.

FIG. 10 is a diagram illustrating a state in which the feeding hose according to the present invention is connected to the rope.

Therefore, when submarine topology is rough or the feeding hose 334 is installed meanderingly on the seabed, as illustrated in FIG. 10, it is preferable that the feeding hose 334 be connected to the rope 510 connecting the anchors 500 and the hydraulic plotters 520. When the feeding hose 334 is connected to the rope 510 as described above, the feeding hose 334 can extend to the underwater fish farm 400 while maximally maintaining the straight-line shape, irrespective of the topology of seabed. Also, the operation of fixing the feeding hose 334 can be performed at a position close to the sea surface, instead of descending down to the seabed. Therefore, the operation of fixing the feeding hose 334 can be performed more rapidly and easily.

Although not illustrated, since the air hose 910 (see FIG. 8) extends to the underwater fish farm 400 along the seabed in a similar manner to the feeding hose 334, the air hose 910 can be coupled to the rope 510 connecting the anchors 500 and the hydraulic plotters 520, instead of the anchors 500.

Figure 11:
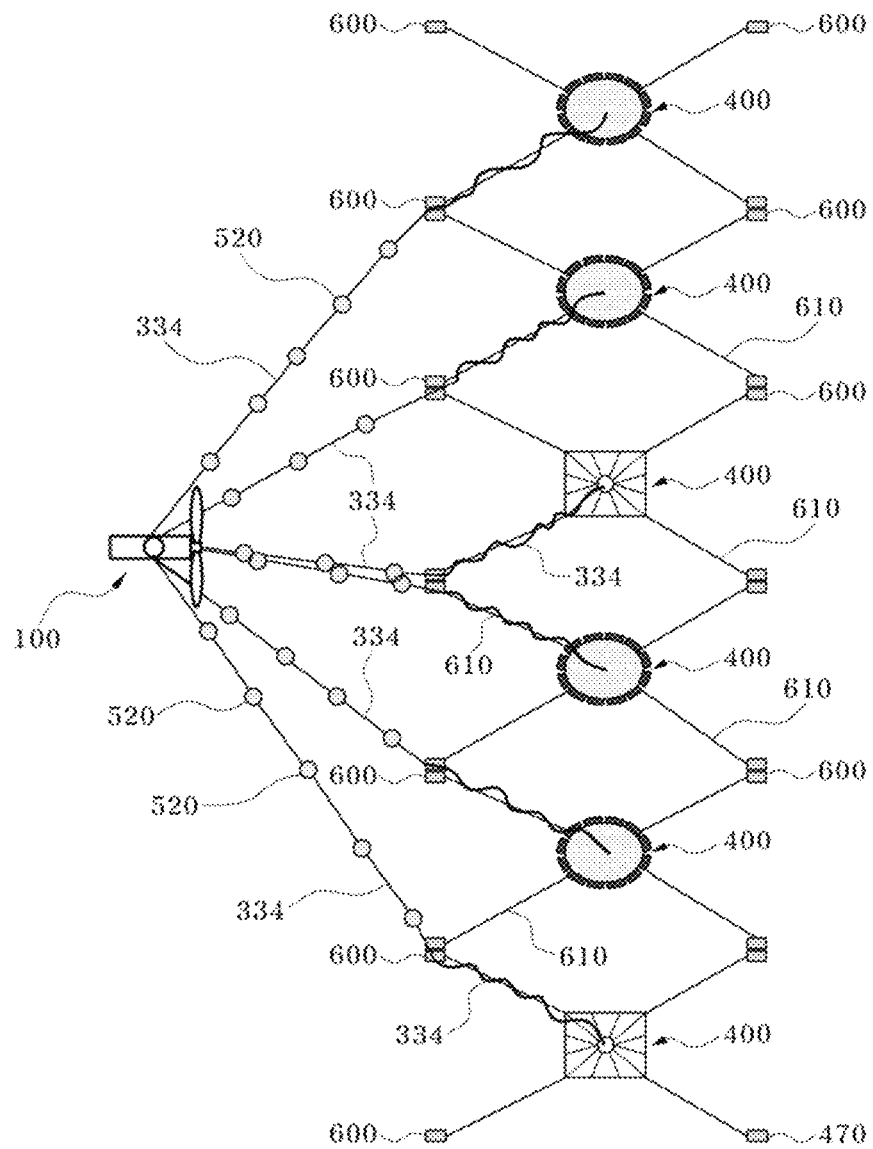
FIG. 11 is a diagram illustrating a state in which feed is supplied to a plurality of underwater fish farms by using the automatic feeding apparatus according to the present invention.

FIG. 11 is a diagram illustrating a state in which feed is supplied to a plurality of underwater fish farms by using the automatic feeding apparatus according to the present invention.

As illustrated in FIG. 11, when a plurality of underwater fish farms 400 are installed under water, feeding hoses 334 of the automatic feeding apparatus installed in the marine base facility 100 are branched into a plurality of pipes extending to the respective underwater fish farms 400, so that feed can be supplied to the respective underwater fish farms 400. In this case, the respective underwater fish farms 400 are connected to the block anchors 600 through the mooring lines 610 and are fixedly installed on the seabed, and the respective feeding hoses 334 are coupled to the anchors 500 or ropes 510 and are fixed to the seabed.

Even when the plurality of underwater fish farms 400 are installed under water, feed can be easily supplied to the respective underwater fish farms 400 by branching the feeding hoses 334, making mass cultivation of fishes possible. In addition, when different feeds are supplied to the respective feeding hoses 334, different types of fish can be cultivated in the respective underwater fish farms 400.

Figure 12:
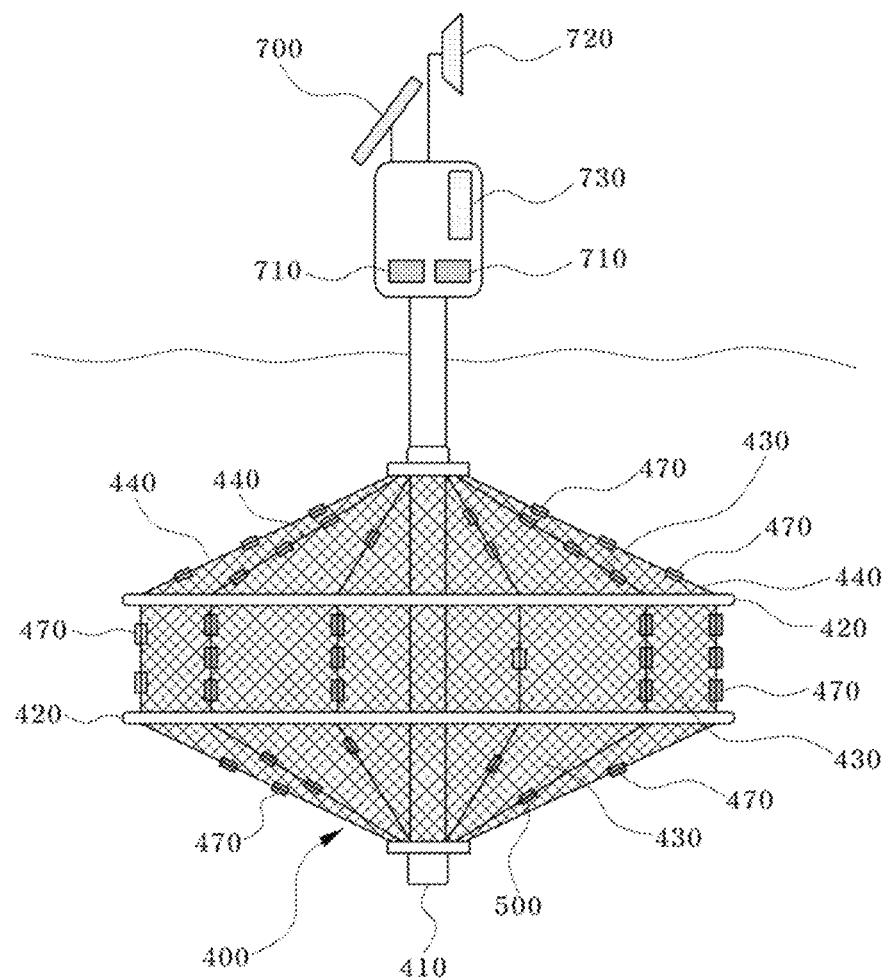
FIG. 12 is a diagram illustrating a state in which an illumination device is installed in the underwater fish farm according to the second embodiment of the present invention.

FIG. 12 is a diagram illustrating a state in which illumination devices are installed in the underwater fish farm according to the second embodiment of the present invention.

As illustrated in FIG. 12, illumination devices 471 may be installed in the underwater fish farm 400 according to the second embodiment of the present invention to illuminate the inside of the underwater fish farm 400 so as to prevent cultivated fishes from dying due to collision with the fishing net. General light bulbs or the like may be used as the illumination devices 470, but LED lamps are preferable in view of power consumption.

When the illumination devices 470 are installed in the underwater fish farm 400, it is preferable that the upper portion of the spar 410 be exposed above the sea surface, and a solar panel 700 be installed in the upper portion of the spar 410 so as to supply power to the illumination devices 470. Since the underwater fish farm 400 according to the second embodiment of the present invention is not installed in the marine base facility 100, it is necessary to install separate power lines extending from the marine base facility 100 to the underwater fish farm 400 so as to supply power to the illumination devices 470 of the underwater fish farm 400. However, it is difficult to install power lines extending from the marine base facility 100 to the underwater fish farm 400, and it is also difficult to repair and maintain the installed power lines. Therefore, it is preferable that power be supplied to the illumination devices 450 by installing an independent power generation facility such as the solar panel 700 in the upper portion of the spar 410 exposed above the sea surface.

In addition, if necessary, a battery 710 may be installed in the upper portion of the spar 410 so as to supply power to the illumination devices 470 even when the solar panel 700 does not operate at night or due to bad weather conditions. Moreover, besides the facilities installed in the marine base facility 100, a wireless antenna 720 and a controller 730 may be installed so as to automatically adjust the illumination intensity of the illumination devices 470 on the ground.

While the embodiments of the present invention have been described with reference to the specific embodiments, it will be apparent to those skilled in the art that various changes and modifications may be made without departing from the spirit and scope of the invention as defined in the following claims.

The invention claimed is:

1. An automatic feeding system for an underwater fish farm, comprising:
   a marine base facility standing vertically in the sea, in which a lower portion is fixed on the seabed and an upper portion is exposed above the sea surface;
   an underwater fish farm for cultivating various types of fish, the fish farm including;
   a pair of rims forming a frame,
   a net covering the rims, and
   a plurality of illumination devices installed on portions of the net, the illumination device being installed to illuminate an inside of the underwater fish farm to prevent cultivated fishes from dying due to collision with the net;
   a storage tank installed inside the marine base facility to store feed to be supplied to the underwater fish farm;
   a feed transfer device transferring the feed discharged through an outlet of the storage tank;
   a feed supply device mixing seawater with the feed transferred by the feed transfer device and supplying the mixture to the underwater fish farm;
   a controller installed inside the marine base facility to control operations of the feed transfer device and the feed supply device.

2. The automatic feeding system of claim 1, wherein the marine base facility is a marine wind power plant in which a wind power generator is installed on the top thereof.

3. The automatic feeding system of claim 1, wherein an observation window is installed in the marine base facility so as to allow persons to view fishes cultivated in the underwater fish farm with naked eyes.

4. The automatic feeding system of claim 1, wherein the marine base facility is installed in plurality in the sea, and bridges are installed to allow persons to walk between the marine base facilities.

5. The automatic feeding system of claim 4, wherein the bridge comprises:
 a top plate installed to allow persons to walk between the marine base facilities;
 a support installed on both ends of the top plate; and
 a wire rope connecting the support and the top plate.

6. The automatic feeding system of claim 4, wherein the bridge is vertically movably installed in the marine base facility.

7. The automatic feeding system of claim 6, wherein the bridge comprises:
 a top plate installed to allow persons to walk between the marine base facilities;
 a support installed on both ends of the top plate; and
 a wire rope connecting the support and the top plate,
 a chain, whose length is adjusted while being wound or unwound, is connected to lower and upper portions of the support, and
 a plurality of guide rollers coming into contact with a side surface of the support are installed on an outer surface of the marine base facility.

8. The automatic feeding system of claim 1, wherein the underwater fish farm further comprises:
 a rope maintaining the net in a tightly stretched state, and first and second fixing devices for fixing the net and the rope are installed in the marine base facility.

9. The automatic feeding system of claim 8, wherein an underwater camera is installed on an outer surface of the marine base facility to photograph the underwater fish farm in real time and transmit photographed images to a controller, and the controller analyzes the photographed images and determines an amount of feed to be supplied to the underwater fish farm.

10. The automatic feeding system of claim 1, wherein the illumination device is an LED lamp.

11. An automatic feeding system for an underwater fish farm, comprising:
 a marine base facility standing vertically in the sea, in which a lower portion is fixed on the seabed and an upper portion is exposed above the sea surface;
 an underwater fish farm for cultivating various types of fish;
 a storage tank installed inside the marine base facility to store feed to be supplied to the underwater fish farm;
 a feed transfer device transferring the feed discharged through an outlet of the storage tank;
 a feed supply device mixing seawater with the feed transferred by the feed transfer device and supplying the mixture to the underwater fish farm;
 a controller installed inside the marine base facility to control operations of the feed transfer device and the feed supply device; and
 an illumination device installed in the underwater fish farm to illuminate an inside of the underwater fish farm to prevent cultivated fishes from dying due to collision with a net,
 wherein the underwater fish farm is installed under water spaced apart from the marine base facility, and
 wherein the underwater fish farm comprises:
 a hollow-pipe-shaped spar serving as a center pillar, in which the spar is capable of being filled with air,
 a rim surrounding the spar,
 a net covering the rim, and
 a rope maintaining the net in a tightly stretched state.

12. The automatic feeding system of claim 11, wherein an air compressor is installed inside the marine base facility, the air compressor being connected to the spar through an air hose to supply compressed air to an inside of the spar.

13. The automatic feeding system of claim 12, wherein the air hose is connected to a plurality of anchors installed along the seabed at regular intervals and fixed to the seabed.

14. The automatic feeding system of claim 11, wherein the spar is exposed above the sea surface, and a solar panel for supplying power to the illumination device is installed in an upper portion of the spar exposed above the sea surface.

15. The automatic feeding system of claim 14, wherein a battery and a controller for automatically adjusting illumination intensity of the illumination device are installed in the upper portion of the spar.

16. An automatic feeding system for an underwater fish farm, comprising:
 a marine base facility standing vertically in the sea, in which a lower portion is fixed on the seabed and an upper portion is exposed above the sea surface;
 an underwater fish farm for cultivating various types of fish;
 a storage tank installed inside the marine base facility to store feed to be supplied to the underwater fish farm;
 a feed transfer device transferring the feed discharged through an outlet of the storage tank;
 a feed supply device mixing seawater with the feed transferred by the feed transfer device and supplying the mixture to the underwater fish farm;
 a controller installed inside the marine base facility to control operations of the feed transfer device and the feed supply device; and
 an illumination device installed in the underwater fish farm to illuminate an inside of the underwater fish farm to prevent cultivated fishes from dying due to collision with a fishing net,
 wherein the underwater fish farm is installed under water spaced apart from the marine base facility, and
 wherein the feed supply device comprises a feeding hose extending to the underwater fish farm along the seabed and supplying a mixture of feed and seawater to the underwater fish farm.

17. The automatic feeding system of claim 16, wherein the feeding hose is connected to a plurality of anchors installed along the seabed at regular intervals and fixed to the seabed.

18. The automatic feeding system of claim 16, wherein the underwater fish farm is installed in plurality under water, and the feeding hose is branched into a plurality of pipes extending to the respective underwater fish farms 400.

* * * * *